(12) United States Patent
Zhen et al.

(10) Patent No.: US 11,050,908 B2
(45) Date of Patent: Jun. 29, 2021

(54) APPARATUS FOR A DUAL-CAMERA DEVICE WITH PRIVACY

(71) Applicant: Huawei Technologies Co., Ltd., Shenzhen (CN)

(72) Inventors: Haitao Zhen, Wuhan (CN); Qingzhi Yang, Wuhan (CN); Jun Yang, Wuhan (CN); Teng Long, Wuhan (CN); Tao Meng, Wuhan (CN); Xuesong Tian, Shenzhen (CN); Weichuan Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/625,474

(22) PCT Filed: Jun. 30, 2017

(86) PCT No.: PCT/CN2017/091175
§ 371 (c)(1),
(2) Date: Dec. 20, 2019

(87) PCT Pub. No.: WO2019/000410
PCT Pub. Date: Jan. 3, 2019

(65) Prior Publication Data
US 2020/0374439 A1    Nov. 26, 2020

(51) Int. Cl.
*H04N 5/225* (2006.01)
*G06F 1/16* (2006.01)
(Continued)

(52) U.S. Cl.
CPC ..... *H04N 5/225251* (2018.08); *G06F 1/1686* (2013.01); *H04N 5/2257* (2013.01); *H04N 5/232* (2013.01)

(58) Field of Classification Search
CPC ............ H04N 5/2257; H04N 5/225251; G06F 1/1686
See application file for complete search history.

(56) References Cited

U.S. PATENT DOCUMENTS

| 2002/0089190 A1* | 7/2002 | Wang | ..................... E05B 63/244 292/251.5 |
| 2008/0002965 A1* | 1/2008 | Huang | ................... G03B 17/04 396/419 |

(Continued)

FOREIGN PATENT DOCUMENTS

| CN | 103557421 A | 2/2014 |
| CN | 103685892 A | 3/2014 |

(Continued)

*Primary Examiner* — Christopher K Peterson
(74) *Attorney, Agent, or Firm* — Conley Rose, P.C.

(57) ABSTRACT

Please replace the original abstract paragraph with the following new paragraph. A mobile terminal includes a housing and a camera. The camera is rotatably coupled to the housing and configured for locking at a specified position. When the camera is locked at a first specified position, the camera is located inside the housing and one side of the camera is exposed outside the housing, and when the camera is locked at a second specified position, a lens of the camera is exposed outside the housing. The mobile terminal further includes a drive apparatus and a touch apparatus. The drive apparatus is configured to drive the camera to rotate, and the touch apparatus includes a touch sensor and a control chip. After receiving a touch signal from the touch sensor, the control chip controls the drive apparatus to drive the camera to rotate to the second specified position.

20 Claims, 6 Drawing Sheets

(51) Int. Cl.
*H04N 5/232* (2006.01)
*G06F 1/3215* (2019.01)
*G06F 1/3234* (2019.01)
*G06F 1/3287* (2019.01)

(56) References Cited

U.S. PATENT DOCUMENTS

| | | | |
|---|---|---|---|
| 2009/0075692 A1* | 3/2009 | Park | H04N 5/232933 |
| | | | 455/556.1 |
| 2015/0189175 A1* | 7/2015 | Fan | H04N 5/23238 |
| | | | 348/37 |
| 2017/0026634 A1* | 1/2017 | Mirlay | G03B 13/02 |
| 2017/0115234 A1* | 4/2017 | Yates | H04N 5/2257 |
| 2017/0123463 A1* | 5/2017 | Douglas | H04N 5/2254 |
| 2017/0374274 A1* | 12/2017 | Martin Perez | G06F 3/0484 |
| 2018/0113270 A1 | 4/2018 | Wei | |

FOREIGN PATENT DOCUMENTS

| | | |
|---|---|---|
| CN | 203722706 U | 7/2014 |
| CN | 104023190 A | 9/2014 |
| CN | 104994261 A | 10/2015 |
| CN | 105430246 A | 3/2016 |
| CN | 105554383 A | 5/2016 |
| CN | 106101306 A | 11/2016 |
| CN | 205692175 U | 11/2016 |
| CN | 106254581 A | 12/2016 |
| CN | 106817450 A | 6/2017 |
| CN | 206224307 U | 6/2017 |
| KR | 20060104571 A | 10/2006 |
| KR | 20130065124 A | 6/2013 |

\* cited by examiner

APPARATUS FOR A DUAL-CAMERA DEVICE WITH PRIVACY

CROSS-REFERENCE TO RELATED APPLICATIONS

This application is a U.S. National Stage of International Patent Application No. PCT/CN2017/091175 filed on June 30, 2017, which is hereby incorporated by reference in its entirety.

TECHNICAL FIELD

This application relates to the field of communications technologies, and in particular, to a mobile terminal.

BACKGROUND

As people pay more attention to privacy, corresponding product improvements have been made to electronic devices to protect user privacy in the prior art. For example, a hidden camera is used in a notebook computer or a tablet computer. FIG. 1 shows a disposing manner of a hidden camera in a notebook computer in the prior art. In FIG. 1, a camera 2 is disposed at the top of a display screen 1 of the notebook computer, and a shielding cover 3 is used to shield the camera 2. When the camera 2 needs to be used, the shielding cover 3 is manually slid in a direction that is indicated by the arrow in FIG. 1, to expose the camera 2. When the camera 2 does not need to be used, the shielding cover 3 is slid in a direction that is opposite to the direction that is indicated by the arrow in FIG. 1, to shield the camera 2. When the foregoing hidden camera is used, the shielding cover needs to be manually slid. This operation is very inconvenient.

SUMMARY

Embodiments of this application provide a mobile terminal, to facilitate use of a camera module.

According to a first aspect, a mobile terminal is provided. The mobile terminal includes a housing and a camera module, where the camera module is rotatably connected to the housing and can be locked at a specified position; when the camera module is locked at a first specified position, the camera module is located inside the housing and one side of the camera module is exposed outside the housing; when the camera module is locked at a second specified position, a lens of the camera module is exposed outside the housing; and the mobile terminal further includes:

a drive apparatus, configured to drive the camera module to rotate; and a touch apparatus, including a touch sensor and a control chip, where after receiving a touch signal from the touch sensor, the control chip controls the drive apparatus to drive the camera module to rotate to the second specified position.

In the foregoing implementation solution, the drive apparatus is configured to drive the camera module to rotate, so that the camera module may be hidden or exposed. In addition, the touch apparatus is configured to control the drive apparatus, to facilitate switching of a working mode and use of the camera module.

In a specific implementation solution, the touch sensor is disposed on the side that is of the camera module and that is exposed outside the housing when the camera module is located at the first specified position, so that the camera module can be easily touched.

In a specific implementation solution, the drive apparatus includes a driving piece that drives the camera module to rotate and a locking component that locks the camera module at the first specified position; and after receiving the touch signal from the touch sensor, the control chip controls the locking component to unlock the camera module, and the driving piece drives the camera module to rotate. The locking component is configured to lock the camera module at the first specified position, to ensure stability when the camera module is hidden. In addition, the locking component may have different structures.

In a specific implementation solution, the locking component includes a locking block that is slidably connected to the housing, an electromagnet that is disposed inside the housing and that is configured to attract the locking block, and a compression spring disposed between the locking block and the electromagnet; when the electromagnet is not powered on, the compression spring pushes the locking block to lock the camera module at the first specified position; and after receiving the touch signal from the touch sensor, the control chip controls the electromagnet to be powered on, the electromagnet attracts the locking block to unlock the camera module, and the driving piece drives the camera module to rotate to the second specified position. During disposing, a sliding slot is disposed on the housing, and the locking block is slidably assembled inside the sliding slot. In addition, when the compression spring rebounds, the locking block is lapped over the camera module, to lock the camera module and prevent the camera module from rotating.

In a specific implementation solution, the locking component includes a locking block that is rotatably connected to the housing, a protrusion that is disposed on the housing and that is configured to limit the locking block, an electromagnet that is disposed inside the housing and that is configured to attract the locking block, and an elastic component that is configured to drive the locking block to rotate; when the electromagnet is not powered on, the elastic component drives the locking block to abut against the protrusion to lock the camera module at the first specified position; and after receiving the touch signal from the touch sensor, the control chip controls the electromagnet to be powered on, the electromagnet attracts the locking block to rotate by a specified angle, and the driving piece drives the camera module to rotate to the second specified position, During disposing, a rotating shaft is disposed on the housing, and the locking block is rotatably connected to the housing by using the rotating shaft. When the locking block abuts against the protrusion, a part of the locking block is lapped over the camera module, to lock the camera module and prevent the camera module from rotating.

In a specific implementation solution, the driving piece includes a first magnet and a second magnet, the first magnet is fixedly connected to the camera module, the second magnet is fixedly connected to the housing, opposite magnetic poles between the first magnet and the second magnet have same or opposite polarity, and repulsion or attraction between the first magnet and the second magnet is used to drive the camera module to rotate. In other words, the driving piece drives the camera module to rotate by using magnetic force.

In a specific implementation solution, the driving piece is a compression spring, a tension spring, or a torsion spring. Different springs are used to drive the camera module to rotate.

In a specific implementation solution, the camera module includes an enclosure and a camera, the enclosure has a cavity accommodating the camera, a sidewall of the enclosure is disposed with a through hole for exposing a lens of the camera, the camera is fastened inside the cavity, and the enclosure is rotatably connected to the housing.

In a specific implementation solution, a connecting bar is disposed on a. sidewall that is of the enclosure and that is opposite to the through hole, the connecting bar is rotatably connected to the housing by using a rotating shaft, and when the locking component includes the electromagnet and the locking block and the electromagnet is not powered on, a part of the locking block is lapped over the connecting bar to lock the enclosure at the first specified position.

In a specific implementation solution, when the camera module is locked at the first specified position, a touch area of the touch sensor is flush with a surface of the housing. This ensures surface flatness of the mobile terminal.

In a specific implementation solution, the camera is a camera with an adjustable focal length. This improves a photographing effect.

In a specific implementation solution, the mobile terminal is a notebook computer, and when the camera module is locked at the first specified position, the side that is of the camera module and that is exposed outside the housing is located on a surface C of the notebook computer. This improves an effect of the camera module in use.

In a specific implementation solution, a side that is of the lens of the camera module and that is exposed outside the housing is located in a non-keyboard area on the surface C of the notebook computer.

In a specific implementation solution, the side that is of the camera module and that is exposed outside the housing is located in a keyboard area on the surface C of the notebook computer.

DESCRIPTION OF EMBODIMENTS

The following clearly and completely describes the technical solutions in the embodiments of this application with reference to the accompanying drawings in the embodiments of this application.

Figure 1:
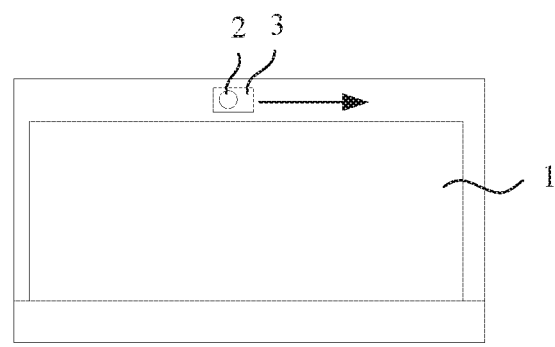
FIG. 1 is a schematic diagram of a disposing manner of a hidden camera of a notebook computer in the prior art.

First, FIG. 1 shows a disposing manner of a hidden camera 2 in the prior art. The camera 2 is shielded by disposing a shielding cover 3. When the camera 2 needs to be used, the shielding cover 3 needs to be manually pulled. It is very inconvenient to use the camera. To improve convenience of using the hidden camera 2, this application provides a mobile terminal. A hidden camera is disposed on the mobile terminal, and the camera is controlled, in a touch manner, to be exposed. This greatly facilitates use of the camera.

An embodiment of this application provides a mobile terminal. The mobile terminal may be a common electronic device such as a tablet computer or a notebook computer. For ease of description, the notebook computer is used as an example to describe the mobile terminal in this application.

Figure 2:
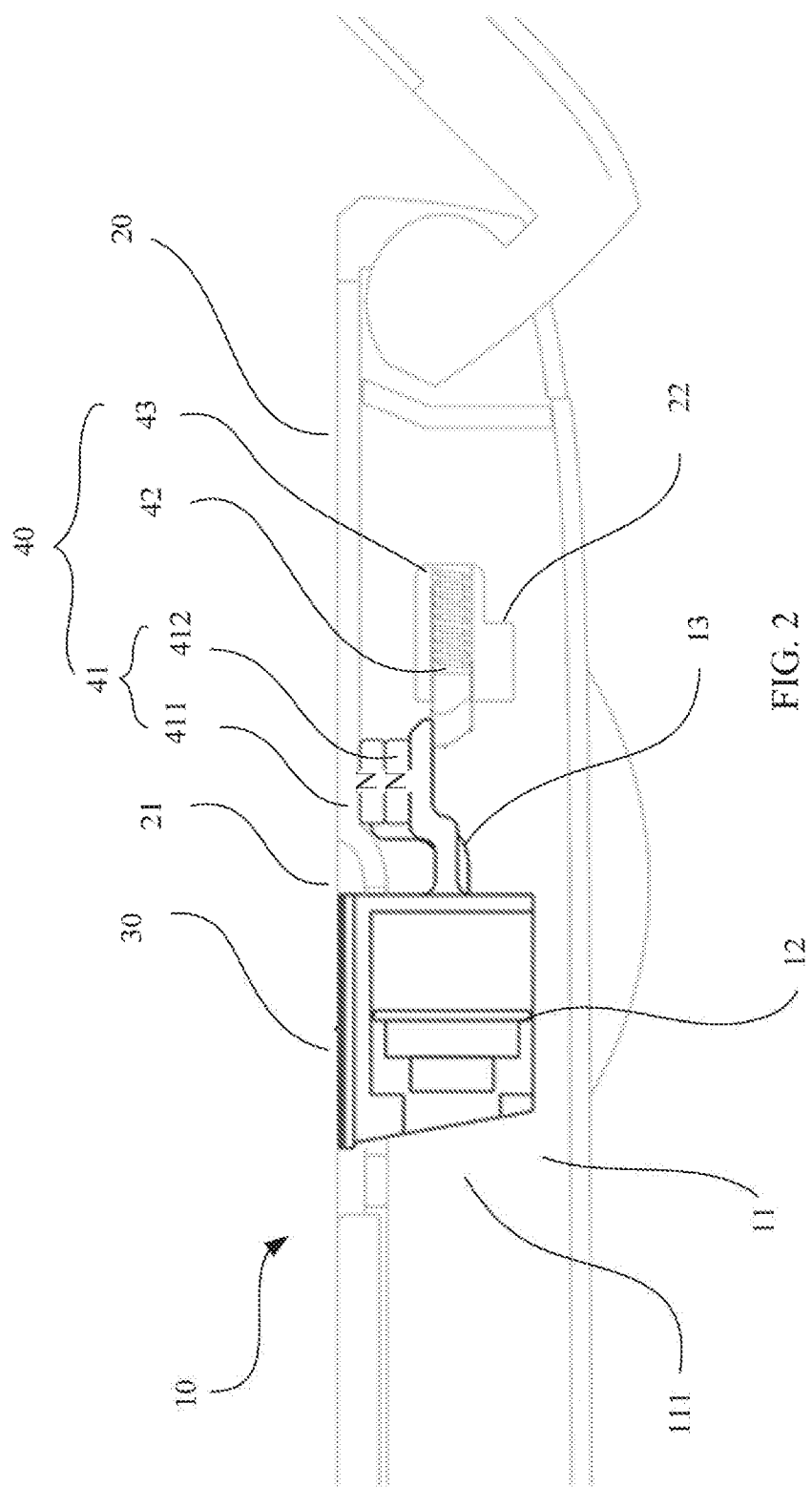
FIG. 2 is a schematic structural diagram of a notebook computer according to an embodiment of this application.

As shown in FIG. 2, the mobile terminal includes a housing 20 and a camera module 10. The camera module 10 is rotatably connected to the housing 20 and can be locked at a specified position. The camera module 10 has two modes: a hidden mode and a working mode. In the hidden mode, the camera module 10 is located inside the housing 20. In the working mode, the camera module 10 rotates outside of the housing 20, and a lens of the camera module 10 is exposed outside the housing 20 and can properly capture an image.

Figure 3:
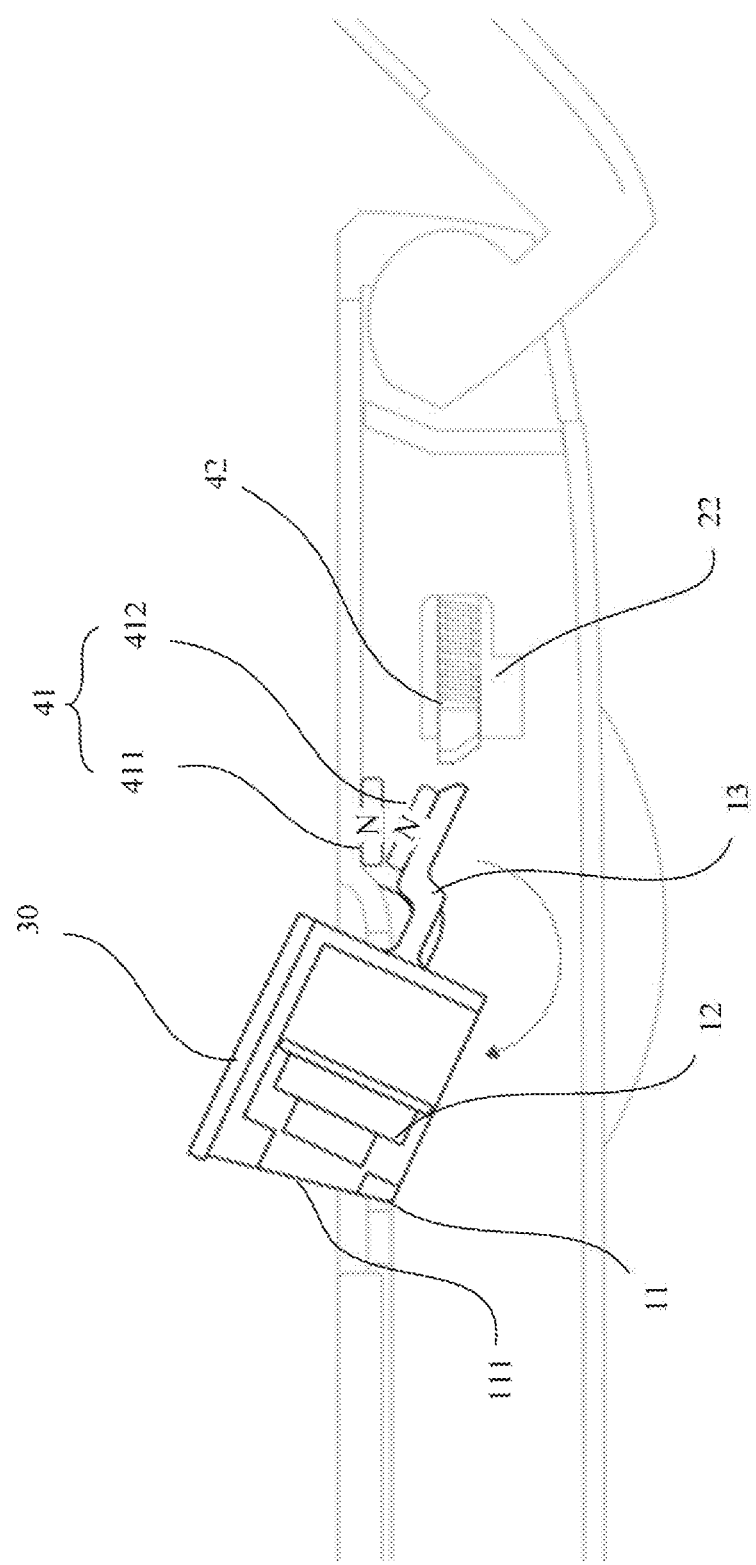
FIG. 3 is a schematic diagram of a camera of a notebook computer in use according to an embodiment of this application.

The following describes two working modes of the camera module 10 with reference to FIG. 2 and FIG. 3. First, FIG. 2 shows the hidden mode of the camera module 10. In this case, as shown in FIG. 2, when the camera module 10 is locked at a first specified position, the camera module 10 is located inside the housing 20 and one side of the camera module 10 is exposed outside the housing 20. In this manner, the housing 20 is disposed with a through hole 21, so that the camera module 10 can rotate to the outside of the housing 20 through the through hole 21. When the camera module 10 is located at the first specified position, the entire camera module 10 is hidden inside the housing 20, and a surface of the camera module 10 is exposed inside the through hole 21. When the camera module 10 rotates from the first specified position to a second specified position, the camera module 10 is exposed through the through hole 21.

FIG. 3 shows the working mode of the camera module 10. In this case, the camera module 10 is locked at the second specified position, and the camera module 10 is exposed outside the housing 20. It should be understood that, in this application, that the camera module 10 is exposed outside the housing 20 means that the camera module 10 rotates to the outside of the housing 20 and the lens of the camera module 10 is exposed outside the housing 20 and can properly capture the image. In FIG. 3, the camera module 10 inclines to a surface C of the notebook computer (a surface that is of the notebook computer and on which a keyboard is disposed) at a specific included angle, so that a capture area of the lens of the camera module 10 is located in an inclined-upward direction above a lens module, to capture an image of the upper body and the head of a user. It should be understood that an inclination angle of the camera module 10 may be set based on an actual need. Therefore, the capture area of the camera module 10 may be adjusted based on sitting heights of different users.

It can be learned from the foregoing description that the camera module 10 of the mobile terminal provided in this embodiment of this application may be in two modes. Switching of the camera module 10 between the two modes is driven by a drive apparatus 40, and the drive apparatus 40 is controlled by a touch apparatus. The touch apparatus includes a touch sensor 30 and a control chip. The touch sensor 30 is configured to receive a touch signal of the user. After receiving a touch signal from the touch sensor 30, the control chip controls the drive apparatus 40 to drive the camera module 10 to rotate to the second specified position. In this solution, the drive apparatus 40 is used to drive the camera module 10 to rotate, so that the camera module 10 can be switched between working modes. In addition, the touch apparatus is used to control the drive apparatus 40, to facilitate switching of a working mode and use of the camera module. Specific adjustment of an angle at which the camera module 10 is exposed can be controlled by using the touch apparatus. To be specific, a touch time is used to determine and adjust the angle at which the camera module 10 is exposed. A longer touch time indicates a larger angle by which the camera module 10 rotates to be exposed, and a shorter touch time indicates a smaller angle by which the camera module 10 rotates to be exposed.

To facilitate understanding of a working condition of the camera module 10 provided in this embodiment, the following describes in detail structural components of the camera module 10, the drive apparatus 40, and the touch apparatus by using specific embodiments.

Figure 4:
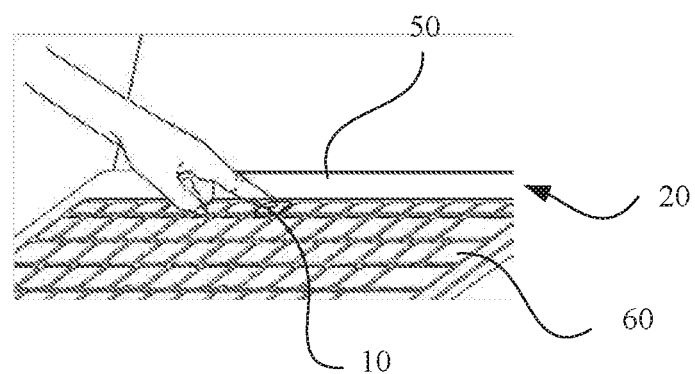
FIG. 4 is a schematic diagram of a position at which a camera of a notebook computer is disposed according to an embodiment of this application.
Figure 5:
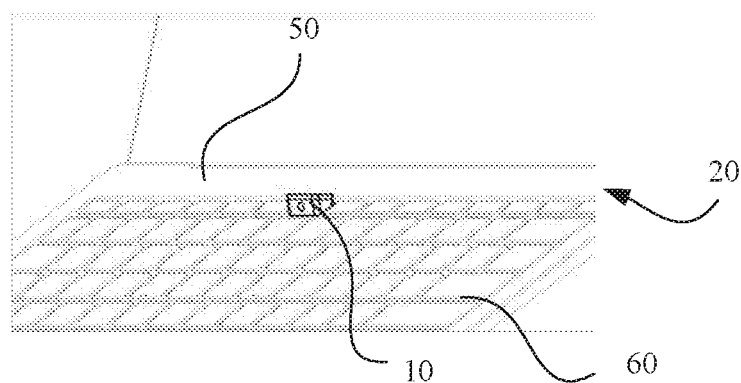
FIG. 5 is a reference diagram of the camera shown in FIG. 4 in a use state.
Figure 6:
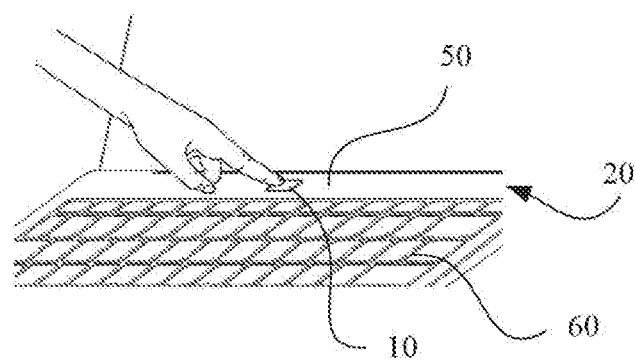
FIG. 6 is a schematic diagram of another position at which a camera of a notebook computer is disposed according to an embodiment of this application.
Figure 7:
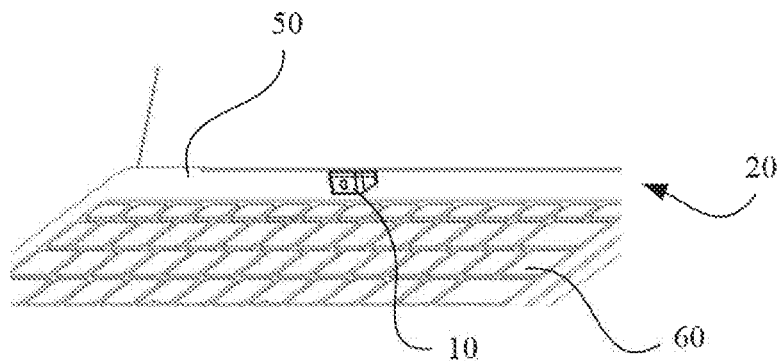
FIG. 7 is a reference diagram of the camera shown in FIG. 6 in a use state.

First, refer to FIG. 2. Description is provided by using an example in which a mobile terminal provided in an embodiment is a notebook computer. In this embodiment, a housing 20 is a housing that is of the notebook computer and that accommodates a hard disk, a mainboard, and a keyboard. A camera module 10 is disposed on a surface C of the notebook computer. As shown in FIG. 2, the surface C is a surface that is of the notebook computer and on which a keyboard is disposed. A sidewall of the housing 20 on the surface C is disposed with a through hole 21, and the camera module 10 is disposed inside the through hole 21 and is rotatably connected to the housing 20. Specifically, when the camera module 10 is locked at a first specified position, one side that is of the camera module 10 and that is exposed outside the housing 20 is located on the surface C of the notebook computer. In specific disposing, the camera module 10 may be located at different positions on the surface C. FIG. 4 and FIG. 5 show a case in which the camera module 10 is located in a keyboard area 60 on the surface C. To be specific, the side that is of the camera module 10 and that is exposed outside the housing 20 is located in the keyboard area 60 on the surface C of the notebook computer. In this case, the camera module 10 occupies a position of one key. Preferably, as shown in FIG. 4, when a screen is unfolded, the camera module 10 is located at a position of a row of keys that is in the keyboard area 60 and that is closest to the screen. In addition, when the camera module 10 is located at the first specified position, a part that is of the camera module 10 and that is exposed outside the housing 20 has a structure similar to that of another key. Therefore, there can be a specific distance between the camera module 10 and a user, to ensure that an image of the user can be captured. Structures shown in FIG. 6 and FIG. 7 may alternatively be used. In this case, the side that is of the camera module 10 and that is exposed outside the housing 20 is located in a non-keyboard area 50 on the surface C of the notebook computer. More specifically, the camera module 10 is located in an area that is located at the top of the keyboard area 60 and that is close to the screen, so that the camera module 10 is farther away from the user and can capture an image of a larger area.

Figure 8:
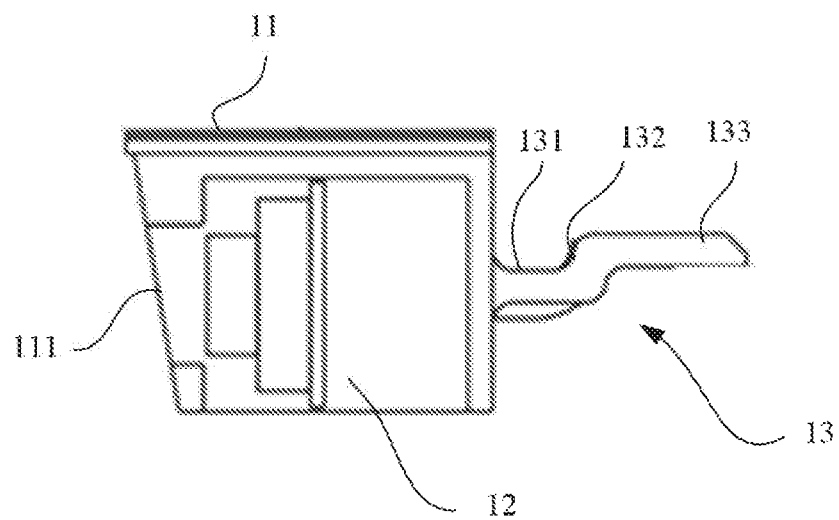
FIG. 8 is a schematic structural diagram of a camera module.

The camera module 10 may include only one camera, or may include a camera 12 and an enclosure 11. When only one camera is used, the camera is rotatably connected to the housing 20. When the enclosure 11 and the camera 12 are used, the enclosure 11 has a cavity accommodating the camera 12. A sidewall of the enclosure 11 is disposed with a through hole 111 for exposing a lens of the camera 12. During assembly, the camera 12 is fastened inside the cavity, and the enclosure 11 is rotatably connected to the housing 20. It should be understood that the camera 12 may be a camera with an adjustable focal length regardless of a manner. As shown in FIG. 2, the enclosure has the cavity accommodating the camera. A sidewall that is of the enclosure and that is exposed outside the housing 20 when the enclosure is located at the first specified position may have a structure similar to an external structure of a key on the notebook computer, for example, have an arc-shaped surface that sinks downward to an extent, or a flat surface. In addition, a sidewall that is of the cavity and that is disposed with the through hole 111 for exposing the camera 12 has an inclined surface, to avoid interference between the enclosure 11 and a sidewall of the through hole 21 when the enclosure 11 is rotated outside of the through hole 21. Specifically, an overall structure of the enclosure 11 is a trapezoidal structure. In six sidewalls of the enclosure 11, a top wall (a sidewall exposed on the surface C when the enclosure 11 is located at the first specified position) and a bottom wall are rectangular, two sidewalls on two sides of the through hole 11 are inverted trapezoids, and the sidewall that is disposed with the through hole 111 is disposed in an inclined manner, to avoid a case in which the enclosure 11 touches the through hole 111 in the housing 20 during rotation of the enclosure 11. FIG. 3 is a schematic diagram illustrating that the camera module 10 rotates to a second specified position. It can be learned from FIG. 3 that, because the sidewall disposed with the through hole 111 is disposed in the inclined manner, a case in which there is interference between the enclosure 11 and the housing 20 when the camera module 10 rotates is avoided. When the camera module 10 is specifically rotatably connected to the housing 20, the enclosure 11 is rotatably connected to the housing 20 by using a rotating shaft. More specifically, a connecting bar 13 is disposed on a sidewall that is of the enclosure 11 and that is opposite to the through hole 111, and the connecting bar 13 is rotatably connected to the housing 20 by using the rotating shaft. As shown in FIG. 2 and FIG. 8, the connecting bar 13 is a bent connecting bar 13. A placement direction of the camera module 10 shown in FIG. 2 is used as a reference direction. The connecting bar 13 includes two parallel horizontal portions and a vertical portion 132 that connects the two horizontal portions, to form a reversed "Z"-shaped structure. Referring to FIG. 8, a horizontal portion connected to the enclosure 11 is a first horizontal portion 131, the other horizontal portion is a second horizontal portion 133, and a horizontal height of the first horizontal portion 131 is lower than a horizontal height of the second horizontal portion 133. When the connecting bar 13 is specifically connected to the housing 20, the rotating shaft penetrates the vertical portion 132 of the connecting bar 13. The second horizontal portion 133 is configured to cooperate with a drive apparatus 40 to drive the camera module 10. The camera module 10 is locked at the second specified position through cooperation between the disposed rotating shaft and the housing 20. For example, a boss is disposed at an end of the rotating shaft, and a corresponding boss is also disposed on the housing 20. When the rotating shaft rotates along with the enclosure 11, the two bosses are lapped together, to prevent the camera module 10 from continuing rotating, and keep the camera module 10 at the second specified position. In addition, a boss that cooperates with the enclosure 11 may be disposed on the vertical portion 132, the first horizontal portion 131, or the second horizontal portion 133 of the connecting bar 13. Alternatively, the first horizontal portion 131 abuts against the housing 20 to prevent the camera module 10 from rotating, so that the camera module 10 cannot continue rotating after rotating to the second specified position, and is kept at the position.

In this embodiment, a touch apparatus is configured to control the drive apparatus 40, The touch apparatus includes a touch sensor 30 and a control chip. The touch sensor 30 is configured to receive a touch signal of the user. Specifically, the touch sensor 30 may be a common sensor such as an infrared sensor, a capacitive sensor, a resistive sensor, or an electromagnetic sensor that detects a characteristic signal of a human body. In specific disposing, the touch sensor 30 is disposed on the side that is of the camera module 10 and that is exposed outside the housing 20 when the camera module 10 is located at the first specified position. In other words, the touch sensor 30 is disposed on the top wall of the enclosure 11. When the camera module 10 needs to be controlled, only the touch sensor 30 on the top wall of the camera module 10 needs to be touched. This disposing manner facilitates touch on the camera module 10 and reduces space that is on the surface C and that is occupied by the entire camera module 10 when the camera module 10 is disposed. In a more specific solution, when the camera module 10 is locked at the first specified position, a touch area of the touch sensor 30 is flush with a surface of the housing 20. Therefore, flatness of the surface C of the notebook computer is ensured, and an overall appearance effect is improved.

The control chip is configured to: process a received touch signal; and when receiving the touch signal, control the drive apparatus 40 to drive the camera module 10 to rotate. The control chip may be a mainboard chip of the notebook computer or a separately disposed chip.

The drive apparatus 40 in this embodiment of this application may perform driving in different manners. A structure of the drive apparatus is described in detail below. The drive apparatus 40 includes two components: a driving piece 41 and a locking component. The driving piece 41 provides power, and is configured to drive the camera module 10 to rotate. The locking component prevents the driving piece 41 from driving the camera module 10 to rotate, and is configured to lock the camera module 10 at the first specified position. In specific use, when the touch apparatus is not touched, the locking component locks the camera module 10 at the first specified position, and prevents the driving piece 41 from driving the camera module 10 to rotate. When the touch apparatus is touched, after receiving the touch signal from the touch sensor 30, the control chip controls the locking component to unlock the camera. module 10. In this case, the driving piece 41 drives the camera module 10 to rotate.

In this embodiment of this application, the driving piece 41 and the locking component each may be implemented by using different structures. The following separately describes the two components. First, the driving piece 41 may have different structures such as a magnet and a spring. For example, when using the magnet, the driving piece 41 includes a first magnet 411 and a second magnet 412. The first magnet 411 is fixedly connected to the camera module 10. Specifically, as shown in FIG. 2, the first magnet 411 is fixedly connected to the second horizontal portion 133, and the second magnet 412 is fixedly connected to the housing 20. In specific disposing, attraction between the first magnet 411 and the second magnet 412 may be used, or repulsion between the first magnet 411 and the second magnet 412 may be used. When the repulsion is used, a structure of the driving piece 41 is shown in FIG. 2. A placement direction of the notebook computer shown in FIG. 2 is used as a reference direction. The second magnet 412 is disposed on a surface that is of the housing 20 and that is opposite to the surface C. In this case, the first magnet 411 is opposite to the second magnet 412, and the second magnet 412 is located above the first magnet 411. When the locking component does not lock the camera module 10, the second magnet 412 pushes the first magnet 411, and the first magnet 411 drives the second horizontal portion 133 to rotate, so as to drive the camera module 10 to rotate. When the attraction between the magnets is used, the second magnet 412 is fastened to the housing 20 and located below the first magnet 411, and always attracts the first magnet 411. When the locking component does not lock the camera module 10, the second magnet 412 attracts the first magnet 411, and the first magnet 411 drives the second horizontal portion 133 to rotate, so as to drive the camera module 10 to rotate. It can be learned from the foregoing description that, when the magnet is used for driving, opposite magnetic poles between the first magnet 411 and the second magnet 412 may have same or opposite polarity during disposing, so that the repulsion or attraction between the first magnet 411 and the second magnet 412 is used to drive the camera module 10 to rotate. In addition, when magnetic force is used, a material that can be attracted by the magnet may be used to make the second horizontal portion 133. In this case, attraction between the second horizontal portion 133 and the magnet is used to drive the camera module 10 to rotate, and a disposing manner in which the attraction between the second horizontal portion 133 and the magnet is used is similar to a disposing manner in which the attraction between the first magnet 411 and the second magnet 412 is used. Details are not described herein again.

When the spring is used to drive the camera module 10, the driving piece 41 may be a compression spring, a tension spring, or a torsion spring. In addition, a specific disposing manner of the spring may be a disposing manner in the prior art. For example, when the compression spring is used, two ends of the compression spring respectively abut against the housing 20 and the second horizontal portion 133; and when the camera module 10 is located at the first specified position, the compression spring is compressed. When the locking component unlocks the camera module 10, the compression spring pushes the camera module 10 to rotate under an effect of elastic force of the compression spring. When the tension spring is used, two ends of the tension spring are respectively connected to the second horizontal portion 133 and the housing 20. When the camera module 10 is located at the first specified position, the tension spring is stretched. When the locking component unlocks the camera module 10, the tension spring pulls the camera module 10 to rotate under an effect of elastic deformation of the tension spring. When the torsion spring is used, the torsion spring is sleeved on the rotating shaft, and two ends of the torsion spring respectively abut against the camera module 10 and the housing 20. When the camera module 10 is located at the first specified position, elastic deformation of the torsion spring occurs. When the locking component unlocks the camera module 10, the torsion spring drives the camera module 10 to rotate under the effect of the elastic deformation of the torsion spring. It should be understood that, although several types of springs are listed, the driving piece 41 in this application may alternatively include another elastic component, such as a spring plate.

It can be learned from the foregoing detailed description that, the driving piece 41 provided in this embodiment of this application may be implemented by using different structures. In the prior art, each structural component that can drive a component to rotate may be applied in this embodiment of this application.

The locking component in this embodiment of this application may alternatively have different structures. The following describes in detail the locking component that has different structures. In a specific implementation solution, FIG. 2 and FIG. 3 show different working modes of the locking component. The locking component includes three parts: a locking block 42, an electromagnet, and a compression spring 43. The locking block 42 is slidably connected to the housing 20. In specific disposing, a sliding slot 22 is disposed on the housing 20, the locking block 42 is slidably assembled inside the sliding slot 22, the electromagnet and the housing 20 are relatively fastened, and the compression spring 43 is disposed between the electromagnet and the locking block 42. When the electromagnet is not powered on, the compression spring 43 pushes the locking block 42 to slide outward, to lock the camera module 10 at the first specified position. In this case, as shown in FIG. 2, a part of the locking block 42 is lapped over the connecting bar 13. More specifically, the locking block 42 is lapped over the second horizontal portion 133, to lock the enclosure 11 at the first specified position, and prevent the driving piece 41 from driving the camera module 10 to rotate. After receiving the touch signal from the touch sensor 30, the control chip controls the electromagnet to be powered on, the electromagnet attracts the locking block 42, the locking block 42 retracts, the part that is of the locking block 42 and that is lapped over the second horizontal portion 133 is removed, to unlock the camera module 10, and the driving piece 41 drives the camera module 10 to rotate to the second specified position. As shown in FIG. 3, when the camera module 10 starts to rotate, the control chip controls the electromagnet to be powered off. In this case, the compression spring 43 pushes the locking block 42 to return to an initial position, so that the camera module 10 can be locked after being used and being pressed down. For the locking block 42 in FIG. 2 and FIG. 3, to facilitate cooperation between the locking block 42 and the second horizontal portion 133, one end that is of the locking block 42 and that cooperates with the camera module 10 is disposed with a guiding slope. The guiding slope is disposed on one side that is of the locking block 42 and that is opposite to a side that is lapped over the second horizontal portion 133. Therefore, when the camera module 10 is pressed down, the second horizontal portion 133 may push away the locking block 42, so that the camera module 10 rotates to the first specified position.

Figure 9:
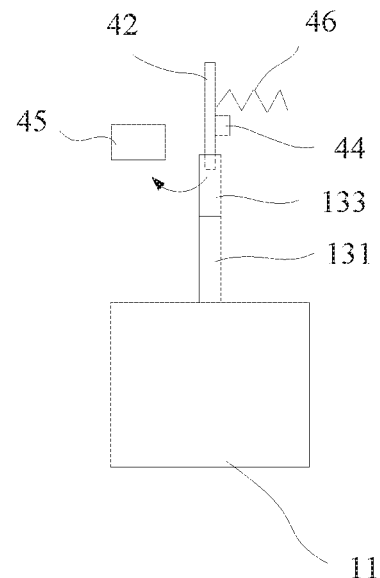
FIG. 9 and FIG. 10 are reference diagrams of use of another driving piece of a notebook computer according to an embodiment of this application.
Figure 10:
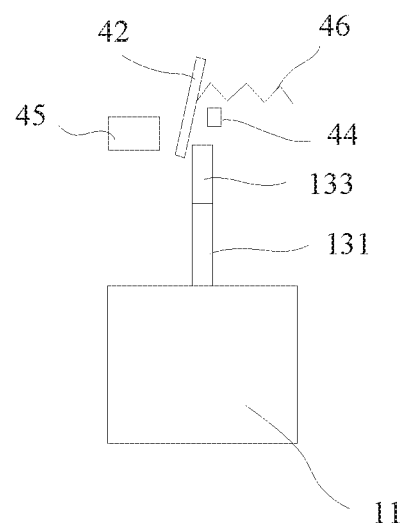

In another locking component, the locking component may have a structure shown in FIG. 9 and FIG. 10. The locking component includes parts such as a locking block 42, an elastic component 46, an electromagnet 45, and a protrusion 44. The protrusion 44 is fastened to the housing 20 to prevent the locking block 42 from rotating. The locking block 42 is connected to the elastic component 46, and the elastic component 46 is configured to drive the locking block 42 to rotate, so that the locking block 42 abuts against the protrusion 44. The electromagnet 45 is located inside the housing 20, and is configured to attract the locking block 42. A direction in which the electromagnet 45 attracts the locking block 42 to rotate is opposite to a direction in which the elastic component 46 drives the locking block 42 to rotate. When the electromagnet 45 is not powered on, the elastic component 46 drives the locking block 42 to abut against the protrusion 44, so that the camera module 10 is locked at the first specified position. After receiving the touch signal of the touch sensor 30, the control chip controls the electromagnet 45 to be powered on, the electromagnet 45 attracts the locking block to rotate by a specified angle, and the driving piece 41 drives the camera module 10 to rotate to the second specified position. Specifically, as shown in FIG. 9, a rotating shaft is disposed on the housing 20. The locking block 42 is rotatably connected to the housing 20 by using the rotating shaft. When the locking block 42 abuts against the protrusion 44, a part of the locking block 42 is lapped over the camera module 10. More specifically, the locking block 42 is lapped over the second horizontal portion 133 in the camera module 10, to lock the camera module 10 and prevent the camera module 10 from rotating. In this case, the electromagnet 45 is not powered on, and the elastic component 46 drives the locking block 42 to abut against the protrusion 44. As shown in FIG. 10, when the electromagnet 45 is powered on, the electromagnet 45 attracts the locking block 42 to overcome force exerted by the elastic component 46 on the camera module 10, so that the locking block 42 rotates to separate parts that are of the locking block 42 and the second horizontal portion 133 and that are lapped, and the camera module 10 starts to rotate. After the camera module 10 rotates, the control chip controls the electromagnet 45 to be powered off, and the locking block 42 abuts against the protrusion 44 again under an effect of the elastic component 46. In addition, a side that is of the locking block 42 and that is opposite to a side that is of the locking block 42 and that is lapped over the second horizontal portion 133 is also disposed with a guiding surface. Therefore, when the camera module 10 is pressed down, the second horizontal portion 133 may push away the locking block 42, so that the camera module 10 rotates to the first specified position. The elastic component 46 may be a common elastic component such as a compression spring, a tension spring, or a torsion spring.

It can be learned from the foregoing description that, in this embodiment of this application, the camera module 10 is controlled, in a touch manner, to be exposed. This facilitates controlling the camera module 10. In comparison with a push-and-pull shielding cover in the prior art, an exposure manner of the camera module 10 is simplified, thereby facilitating use by the user.

Apparently, a person skilled in the art can make various modifications and variations to the embodiments of this application without departing from the spirit and scope of this application. This application is intended to cover these modifications and variations provided that they fall within the protection scope defined by the following claims and their equivalent technologies.

What is claimed is:

1. A mobile terminal, comprising:
a housing;
a camera module rotatably coupled to the housing and configured for locking at a specified position, wherein the camera module comprises:
a camera comprising a lens; and
an enclosure rotatably coupled to the housing and having a first sidewall and a cavity accommodating the camera, wherein the camera is fastened inside the cavity, wherein the first sidewall has a through hole for exposing the lens, wherein the camera module is located inside the housing and a first top side of the camera module is exposed to an outside of the housing when the camera module is locked at a first specified position, and wherein a first the lens of the camera is exposed to the outside of the housing when the camera module is locked at a second specified position;

a movement apparatus configured to drive the camera module to rotate between the first specified position in the housing and the second specified position outside the housing in a vertical direction with respect to the mobile terminal and a user of the mobile terminal, wherein the camera module is not extendable and is not slidable outside the housing;

a touch based electronic tactile sensor configured to sense a touch action of the user and send a touch signal; and a computer processor configured to receive the touch signal from the touch based electronic tactile sensor, and control the movement apparatus to drive the camera to rotate to the second specified position.

2. The mobile terminal of claim 1, wherein the touch based electronic tactile sensor is disposed on the first top side when the camera module is located at the first specified position.

3. The mobile terminal of claim 1, wherein the drive movement apparatus comprises:

a motor configured to drive the camera to rotate; and a lock mechanism configured to lock the camera at the first specified position, wherein after receiving the touch signal from the touch based electronic tactile sensor, the computer processor is further configured to control the lock mechanism to unlock the camera, and control the motor to drive the camera to rotate.

4. The mobile terminal of claim 3, wherein the locking component lock mechanism comprises:

a locking block slidably coupled to the housing;

an electromagnet disposed inside the housing and configured to attract the locking block; and a compression spring disposed between the locking block and the electromagnet and configured to push the locking block to lock the camera at the first specified position when the electromagnet is not powered on, wherein after receiving the touch signal from the touch based electronic tactile sensor, the computer processor is further configured to control the electromagnet to be powered on to enable the electromagnet to attract the locking block to unlock the camera, and control the driving piece motor to drive the camera to rotate to the second specified position.

5. The mobile terminal of claim 3, wherein the lock mechanism comprises:

a locking block rotatably coupled to the housing;

a protrusion disposed on the housing and configured to limit the locking block;

an electromagnet disposed inside the housing and configured to attract the locking block; and an elastic component configured to:

drive the locking block to rotate; and drive the locking block to abut against the protrusion to lock the camera at the first specified position when the electromagnet is not powered on, wherein after receiving the touch signal from the touch based electronic tactile sensor, the computer processor is further configured to control the electromagnet to be powered on to enable the electromagnet to attract the locking block to rotate by a specified angle, and control the motor to drive the camera to rotate to the second specified position.

6. The mobile terminal of claim 3, wherein the driving piece motor comprises:

a first magnet fixedly coupled to the camera; and a second magnet fixedly coupled to the housing, wherein opposite magnetic poles between the first magnet and the second magnet have a same polarity, and wherein the first magnet and the second magnet are configured to repulse each other to drive the camera to rotate.

7. The mobile terminal of claim 3, wherein the driving piece motor comprises:

a first magnet fixedly coupled to the camera; and a second magnet fixedly coupled to the housing, wherein opposite magnetic poles between the first magnet and the second magnet have opposite polarity, and wherein the first magnet and the second magnet are configured to attract each other to drive the camera to rotate.

8. The mobile terminal of claim 3, wherein the driving piece motor comprises a compression spring.

9. The mobile terminal of claim 3, wherein the driving piece motor comprises a tension spring.

10. The mobile terminal of claim 3, wherein the driving piece motor comprises a torsion spring.

11. The mobile terminal of claim 1, wherein the movement apparatus comprises a lock mechanism, and wherein the lock mechanism comprises an electromagnet and a locking block.

12. The mobile terminal of claim 11, wherein a connecting bar is disposed on a second sidewall of the enclosure opposite to the through hole, wherein the connecting bar is rotatably coupled to the housing using a rotating shaft, and wherein a part of the locking block is lapped over the connecting bar in a configuration to lock the enclosure at the first specified position when the electromagnet is not powered on.

13. The mobile terminal of claim 1, wherein the camera is configured with an adjustable focal length.

14. The mobile terminal of claim 1, wherein a touch area of the touch based electronic tactile sensor is flush with a surface of the housing when the camera is locked at the first specified position.

15. The mobile terminal of claim 1, wherein the mobile terminal is a notebook computer, and wherein the first top side of the camera is located on a surface of the notebook computer when the camera is locked at the first specified position.

16. The mobile terminal of claim 15, wherein the first top side of the camera is located in a non-keyboard area on the surface of the notebook computer.

17. The mobile terminal of claim 15, wherein the first top side of the camera is located in a keyboard area on the surface of the notebook computer.

18. The mobile terminal of claim 1, wherein the housing comprises a sliding slot.

19. The mobile terminal of claim 1, wherein the camera comprises a camera circuit.

20. The mobile terminal of claim 1, wherein the first sidewall of the enclosure has an inclined surface for allowing rotation of the enclosure in and out of the housing.

* * * * *

UNITED STATES PATENT AND TRADEMARK OFFICE
CERTIFICATE OF CORRECTION

| | | |
|---|---|---|
| PATENT NO. | : 11,050,908 B2 | Page 1 of 2 |
| APPLICATION NO. | : 16/625474 | |
| DATED | : June 29, 2021 | |
| INVENTOR(S) | : Haitao Zhen et al. | |

It is certified that error appears in the above-identified patent and that said Letters Patent is hereby corrected as shown below:

In the Claims

Claim 1, Column 10, Line 61: "and a first top side" should read "and a top side"

Claim 1, Column 10, Line 64: "wherein a first the lens" should read "wherein the lens"

Claim 2, Column 11, Line 15: "on the first top" should read "on the top"

Claim 3, Column 11, Lines 18 and 19: "wherein the drive movement" should read "wherein the movement"

Claim 4, Column 11, Lines 28 and 29: "wherein the locking component lock" should read "wherein the lock"

Claim 4, Column 11, Line 42: "driving piece motor" should read "motor"

Claim 6, Column 11, Lines 63 and 64: "wherein the driving piece motor" should read "wherein the motor"

Claim 7, Column 12, Lines 8 and 9: "wherein the driving piece motor" should read "wherein the motor"

Claim 8, Column 12, Lines 17 and 18: "wherein the driving piece motor" should read "wherein the motor"

Claim 9, Column 12, Lines 19 and 20: "wherein the driving piece motor" should read "wherein the motor"

Claim 10, Column 12, Lines 21 and 22: "wherein the driving piece motor" should read "wherein the motor"

Signed and Sealed this
Seventeenth Day of August, 2021

Drew Hirshfeld
*Performing the Functions and Duties of the
Under Secretary of Commerce for Intellectual Property and
Director of the United States Patent and Trademark Office*

CERTIFICATE OF CORRECTION (continued)
U.S. Pat. No. 11,050,908 B2

Claim 15, Column 12, Line 46: "wherein the first top" should read "wherein the top"

Claim 16, Column 12, Line 50: "wherein the first top" should read "wherein the top"

Claim 17, Column 12, Line 53: "wherein the first top" should read "wherein the top"